United States Patent [19]

Griffis

[11] Patent Number: 4,813,984
[45] Date of Patent: Mar. 21, 1989

[54] SELF-CONTAINED AIR MONITORING UNIT WITH AGITATED AIR CAPABILITY

[76] Inventor: Steven C. Griffis, 2929 Avenue D, Council Bluff, Iowa 51501

[21] Appl. No.: 180,327

[22] Filed: Apr. 11, 1988

[51] Int. Cl.$^4$ .................... B01D 53/20; B01D 46/10
[52] U.S. Cl. ........................................ 55/270; 55/472; 73/863.31; 73/864.34
[58] Field of Search .................. 55/270, 274, 472; 73/863.31, 863.83, 864.34

[56] References Cited

U.S. PATENT DOCUMENTS

| | | | |
|---|---|---|---|
| 3,410,059 | 11/1968 | Garnier | 55/270 |
| 3,903,745 | 9/1975 | Bolser | 73/864.34 X |
| 4,080,832 | 3/1978 | Moody et al. | 73/864.34 X |
| 4,202,212 | 5/1980 | Allen et al. | 55/270 X |
| 4,704,910 | 11/1987 | Conrad | 73/863.31 X |

*Primary Examiner*—Charles Hart
*Attorney, Agent, or Firm*—Zarley, McKee, Thomte, Voorhees & Sease

[57] ABSTRACT

A self-contained air monitoring unit with agitated air capability comprising a cabinet having an air pump compartment provided therein into which is furnished filtered air. A blower is provided in the cabinet for drawing air inwardly through the air intake of the cabinet through the air pump compartment and outwardly through a port at the rearward end of the cabinet. An elongated flexible hose may be secured to the air outlet on the cabinet to agitate the air within the space in which an asbestos abatement action has been conducted. A plurality of air pumps are located within the air pump compartment and have their intakes operatively connected to an air sampler located within the space in which the asbestos abatement action is being conducted. During the asbestos abatement action, the air pumps in the air compartment are contained in a clean environment and are cooled by air passing thereover.

4 Claims, 3 Drawing Sheets

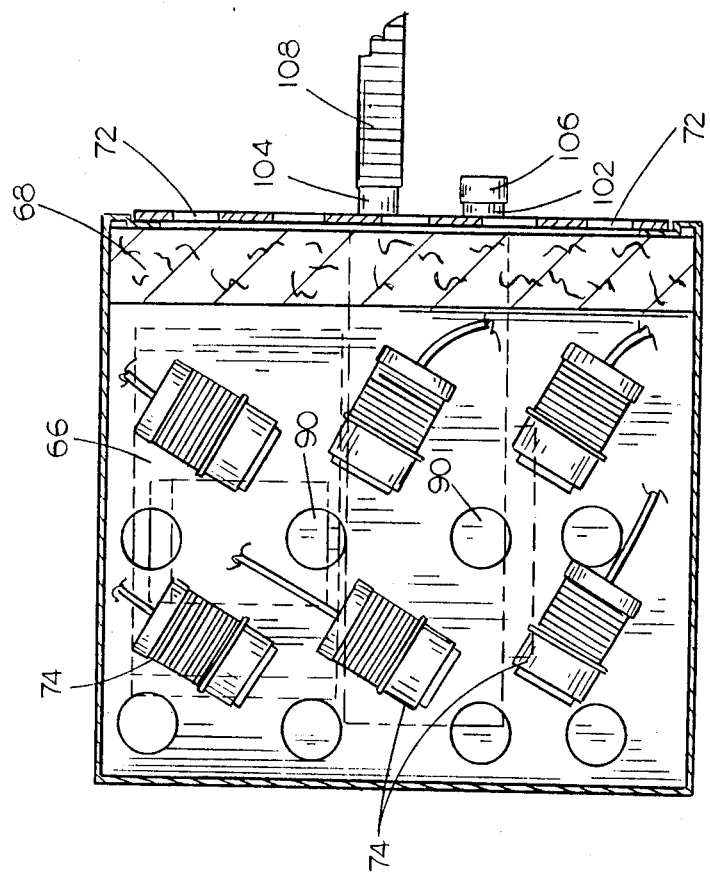
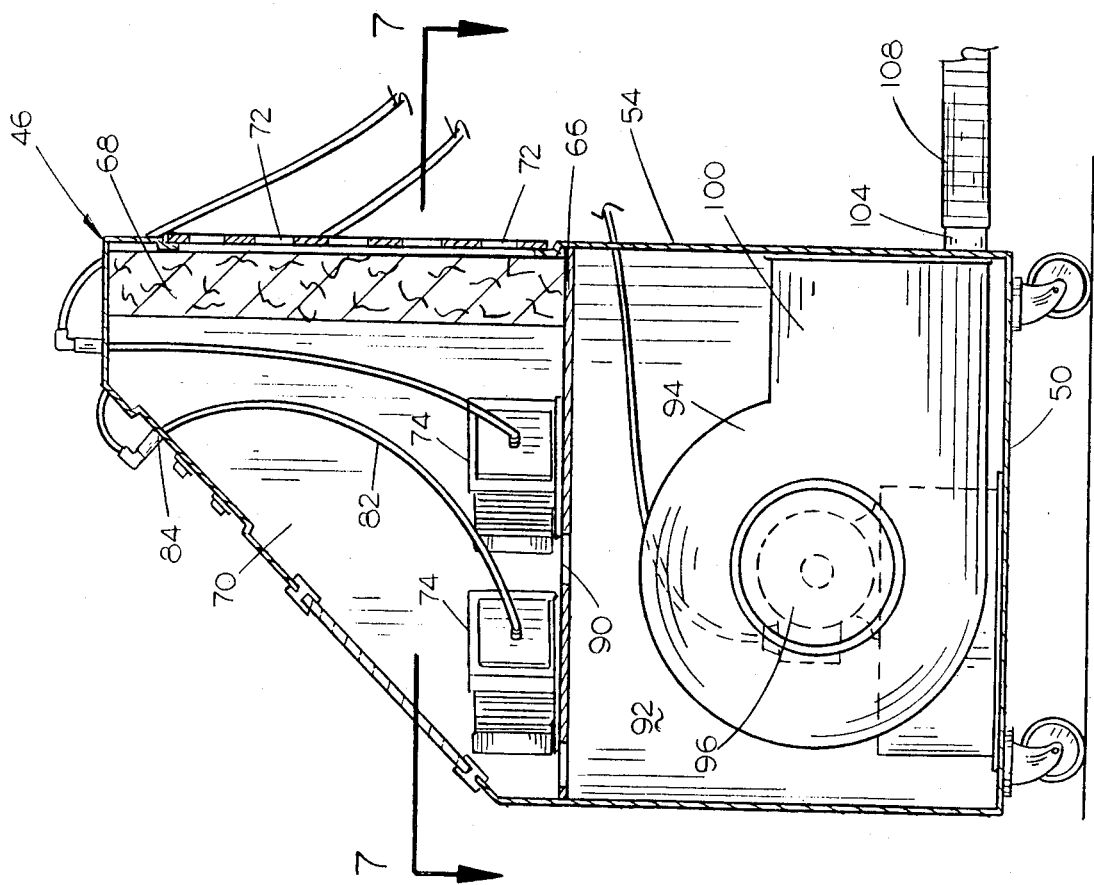
FIG. 7
FIG. 6

SELF-CONTAINED AIR MONITORING UNIT WITH AGITATED AIR CAPABILITY

BACKGROUND OF THE INVENTION

Airborne asbestos contamination in buildings is a significant environmental problem. Various diseases have been linked with industrial exposure to airborne asbestos, and the extensive use of asbestos products in buildings has raised concerns about exposure to asbestos in nonindustrial settings. Surveys conducted by the Environmental Protection Agency (EPA) estimate that asbestos containing materials can be found in approximately 31,000 schools and 733,000 other public and commercial buildings in this country.

In an effort to avoid the hazards associated with exposure to airborne asbestos, abatement actions or procedures are being extensively conducted and the Environmental Protection Agency has published a booklet entitled "Guidance for Controlling Asbestos-Containing Materials in Building". During the abatement action, several air sampling units are positioned throughout the work site to monitor the level of the airborne asbestos materials. Sampling for asbestos consists of collecting fibers by drawing air through a filter at a known rate. Usually, sampling equipment is placed at a fixed location for a certain period of time. Standard sampling equipment consists of a pump (operated at a two to twelve liter per minute flow rate), a filter in a cassette and associated tubing and supports. During the abatement action, the pumps frequently become exteriorly contaminated with the asbestos material. AFter the abatement action has been completed and the work site has been properly cleaned, sampling equipment is used to sample the air in the clean work site. Frequently, the same sampling equipment used during the abatement action is used for the final air sample. Because the sampling equipment is contaminated itself with asbestos material, the final air sample may be inaccurate since the contamination on the sampling unit itself may be drawn into the filter. This is especially true when a short length of tubing is employed between the pump and the filter since the vibration of the pump, when operated, will loosen the contamination on the pump and the same may possibly be drawn into the filter.

Further, during the final air sampling operation, the EPA recommends that "aggressive sampling" be utilized during the post-abatement air test. An aggressive sampling method involves using forced-air equipment such as a leaf blower to dislodge free fibers, then using slow-speed fans to keep the fibers suspended during sampling. The problem connected with such a procedure is that the leaf blower itself is very likely contaminated through use at other work sites and the use of the contaminated leaf blower will give rise to inaccurate samples.

It is therefore a principal object of the invention to provide a self-contained air monitoring unit.

A further object of the invention is to provide a self-contained air monitoring unit having the capability to agitate the air within a work site.

A further object of the invention is to provide an air monitoring unit wherein the air pumps are not contaminated during the monitoring procedure.

Still another object of the invention is to provide an air monitoring unit including a cabinet having a plurality of air pumps mounted therein with the air pumps only being subjected to filtered air so as to remain contaminant-free.

Yet another object of the invention is to provide an air monitoring unit which is easy to operate and which has controls associated therewith so that all of the air pumps may be activated in a substantially simultaneous fashion.

Further, it is a principal object of this invention to provide an air monitoring unit having a filter air discharge associated therewith which may be used during aggressive sampling procedures.

These and other objects will be apparent to those skilled in the art.

BRIEF DESCRIPTION OF THE DRAWINGS

FIG. 6 is a vertical sectional view through the air monitoring unit; and

FIG. 7 is a sectional view taken at lines 7—7 in FIG. 6.

DESCRIPTION OF THE PREFERRED EMBODIMENT

Figure 1:
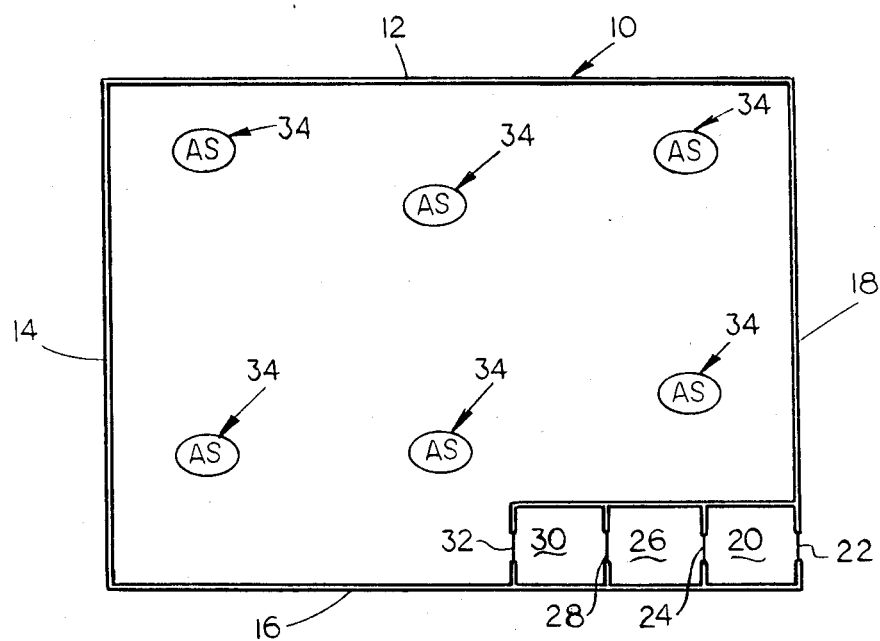
FIG. 1 is a plan view of a room having prior art air samplers located therein.
Figure 2:
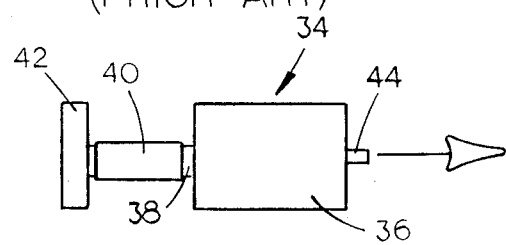
FIG. 2 is an enlarged elevational view of a conventional air sampler.
Figure 3:
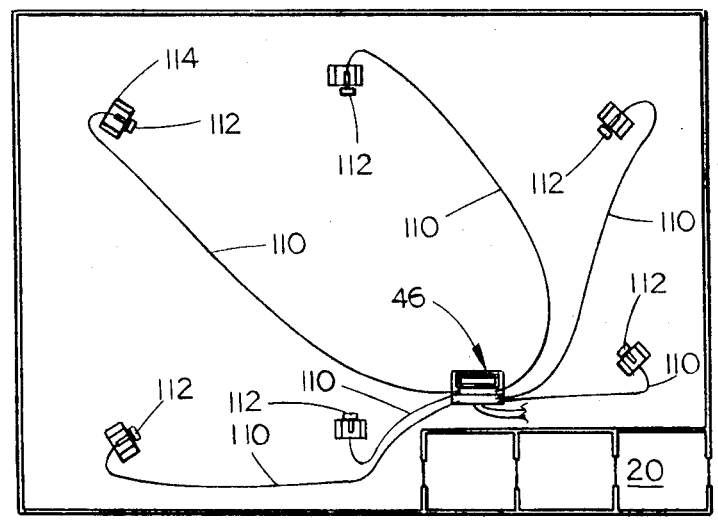
FIG. 3 is a plan view of a room having the self-contained air monitoring unit of the present invention therein.
Figure 4:
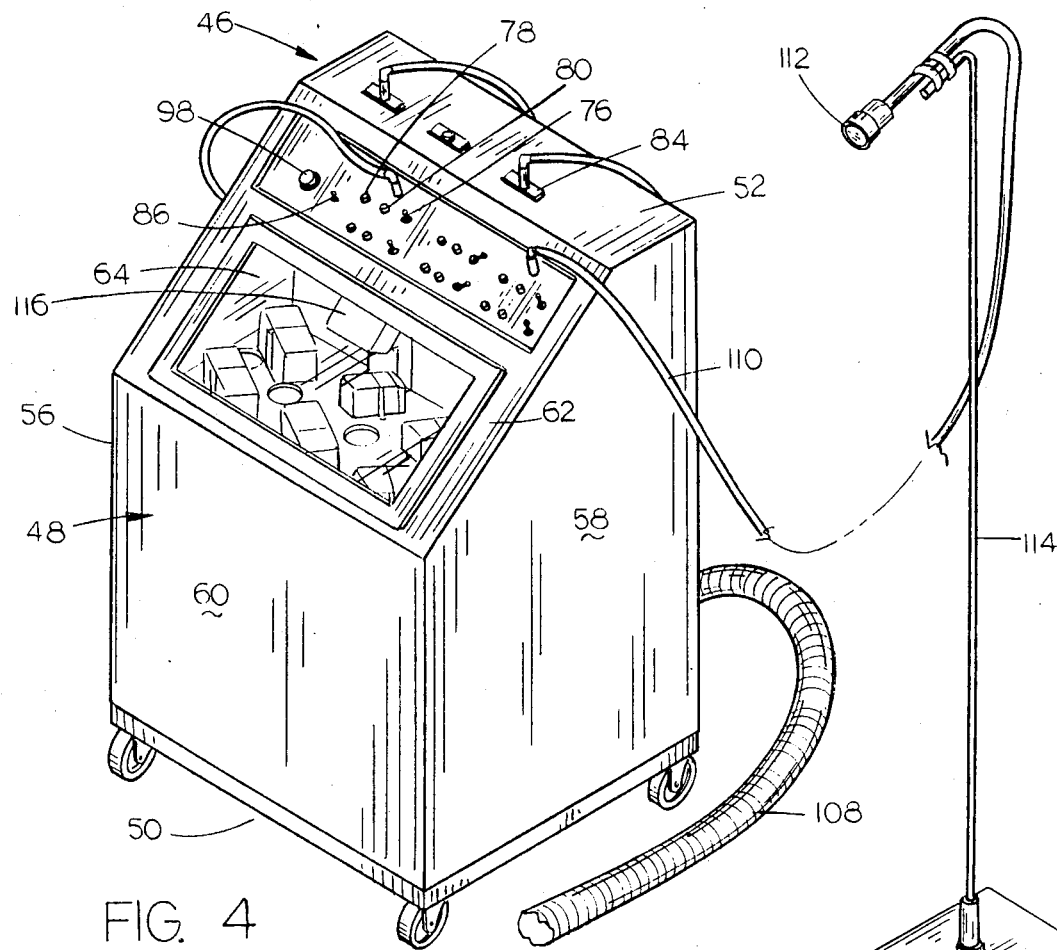
FIG. 4 is a front perspective view of the invention.
Figure 5:
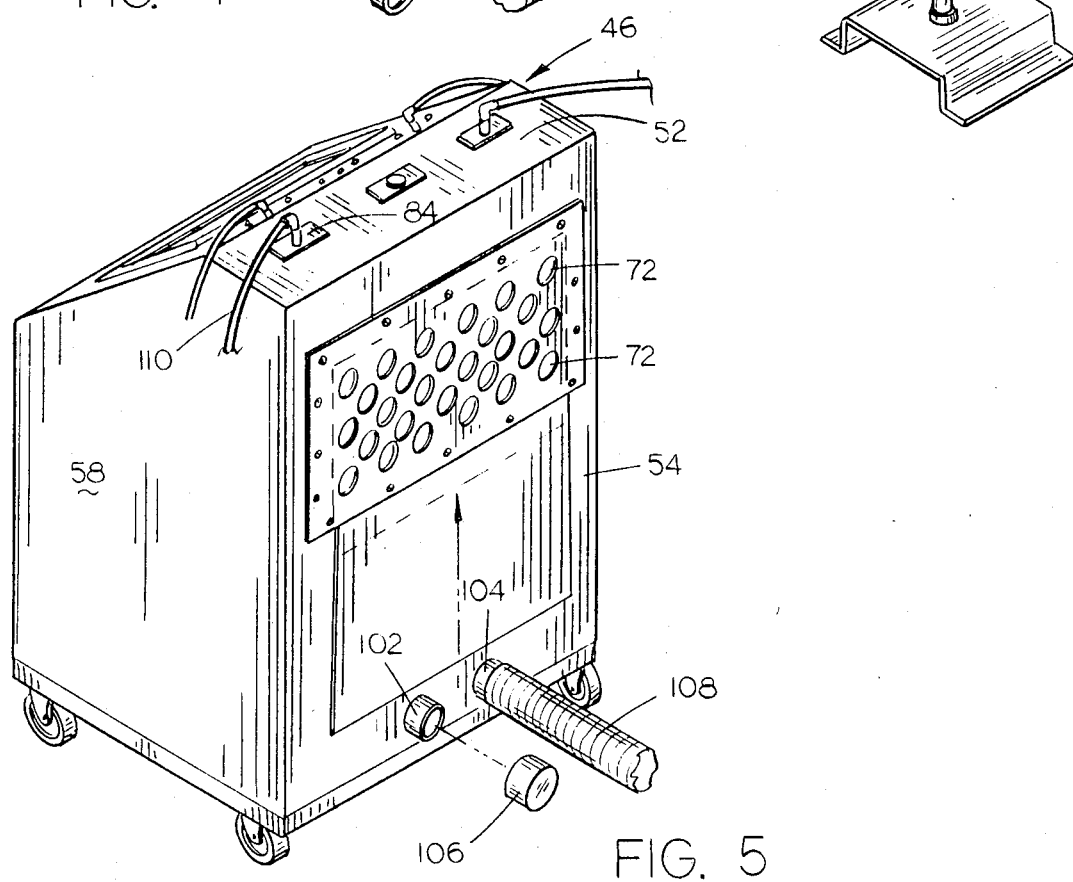
FIG. 5 is a rear perspective view of the invention.

In FIG. 1, the numeral 10 refers generally to an enclosed space from which the asbestos is to be removed. Enclosed space 10 is either defined by the walls of the building structure or by temporary walls. In either case, the walls are referred to generally by the reference numerals 12, 14, 16 and 18. The walls would normally be sealed with a plastic sheeting material to prevent the escape of fibers therefrom. In most projects, a clean room 20 is provided having an entrance 22. Door 24 connects clean room 20 with shower room 26. Door 28 connects shower room 26 with equipment room 30. Door 32 connects equipment room 30 with the enclosed space 10. Doors 24, 28 and 32 are normally comprised of a flexible plastic material which may be pushed aside when passing therethrough.

During the asbestos abatement action, a plurality of air sampling units or air samplers 34 are located throughout the enclosed space 10. The conventional air sampling unit 34 comprises an air pump 36 having an intake 38 to which a short piece of tubing 40 is connected. A conventional sampling cassette 42 is secured to the tubing 40 and includes a filter which traps the airborne asbestos fibers passing therethrough. Pump 36 includes an exhaust 44. When the air sampling units 34 are used to monitor the air within the enclosed space 10 during the asbestos abatement process, the exterior of the pump 36 as well as the tubing 40 quite likely will be contaminated with asbestos fibers. Thus, if the same air sampling units 34 are used during the final air sampling procedure, after the asbestos abatement procedure has been completed, vibration of the pump 36 could very well loosen fibers thereon which would be drawn into the sampling cassette 42. Further, if a plurality of the sampling units 34 are being utilized during the final air sampling procedure, it is difficult to actuate or energize all of the sampling units 34 at approximately the same time. This is quite important inasmuch as each of the air sampling units should be run simultaneously for the same period of time to ensure that the required amount of air has been drawn through the sampling cassette 42.

To overcome the disadvantages of the prior art, applicant has provided a self-contained air monitoring unit which is referred to generally by the reference numeral 46. Unit 46 comprises a cabinet 48 comprising a bottom 50, top 52, back wall 54, sides 56 and 58, and front wall portions 60 and 62. As seen in the drawings, front wall portion 62 is provided with glass or window portion 64 to permit the observation of some of the components of the unit.

The interior of cabinet 48 is provided with a horizontally disposed floor 66 spaced above the lower end thereof. A conventional HEPA filter 68 is positioned with cabinet 48 as seen in the drawings to create a compartment 70 forwardly thereof. Back wall 54 is provided with plurality of air intake openings 72 to permit air to enter the interior of the cabinet and to pass through the HEPA filter 68. A plurality of air pumps 74 are mounted on the floor 66 in the compartment 70 and are identical to the air pumps 34 previously described. Pumps 74 are electrically operated and are designed to draw air through the inlet thereof at a predetermined flow rate. A switch 76, fuse 78 and light 80 are provided for each of the pumps 74. Each of the pumps 74 has a hose 82 extending from the inlet thereof to a coupler receptacle 84 provided on the cabinet. A light switch 86 is also provided on the cabinet which is electrically connected to one or more lights located within the compartment 70 to illuminate the same.

Floor 66 is provided with a plurality of openings 90 formed therein which communicate with blower compartment 92 located below floor 66. A conventional squirrel cage blower 94 is mounted in the compartment 92 and has an air intake 96 provided at one side thereof. Blower 94 is electrically controlled by means of a fan controller 98 located on the cabinet which is of the theostat type to enable the speed of the blower or fan 94 to be regulated. Blower 94 is provided with an air discharge shroud or conduit 100 extending therefrom which abuts against the interior of back wall 54. A pair of selectively closable pipes 102 and 104 communicate with the interior of conduit 100 so that air may be blown outwardly through the pipes 102 and 104. Each of the pipes 102 and 104 is selectively adapted to receive either a closure cap 106 or a flexible hose 108.

A flexible tube or hose 110 extends from each of the coupler receptacles 84 to conventional air sampler cassette or filter referred to generally by the reference numeral 112. Preferably, each of the sampler cassettes 112 is supported on a vertically adjustable support 114 so that the sampler cassette may be positioned at the desired height.

During the abatement process, the sampling cassettes 112 would be located in the enclosed space 10 at the desired locations and at the proper height such as at breathing level. During the abatement process, the unit 46 would normally be located in clean room 20. Each of the pumps 74 is activated or energized so that air will be drawn through the sampler cassettes 112. Blower 94 in cabinet 48 is also energized so that air will be drawn into the cabinet 48 through the openings 72, through filter 68, into compartment 70, around the pumps 74 and downwardly through openings 90 into compartment 92. By such an arrangement, clean cooling air enters compartment 70 and passes over and around the pumps 74 to prevent overheating of the same. Blower 94 is selectively controlled so that air is drawn thereinto and is discharged outwardly through the pipes 102 and 104. Thus, during the asbestos abatement process, the pumps 74 are kept in a clean environment so that they will not become contaminated with asbestos fibers.

When the abatement process has been completed and it is desired to conduct the final air sample, the air within the enclosed space 10 is allowed to settle for a predetermined period of time. The filters in the sampler cassettes are then removed and replaced with new cassettes. Unit 46 is then positioned in the enclosed space 10. At that time, blower 94 is actuated so as to discharge air outwardly through either of the pipes 102 and 104 and into the hoses 108 so that an aggressive air sample can be obtained. The air being discharged from hose 108 will be directed into corners, crevices, etc. to cause any asbestos fibers in the enclosed spaced 10 to become airborne.

The pumps 74 are also substantially simultaneously energized with the time of such energization being noted. For that purpose, a digital clock 116 is provided so that the operator may record the same. During the final air sample, the air within space 10 cannot be contaminated, as in the prior art, by contaminants on the pumps 74 since the pumps have been maintained in a clean condition by being located within the cabinet. Further, the air being discharged from the hose 108 is filtered air and is free of any contaminants such as may occur when a leaf blower or the like is brought into the area to agitate the air in the space 10.

Thus it can be seen that the invention accomplishes at least all of its stated objectives.

I claim:

1. A self-contained air monitoring unit,
an enclosed cabinet means having an air intake means and an air exhaust means,
an air pump compartment within said cabinet means,
at least one electrically operated air pump positioned in said compartment and having an air intake and an air exhaust,
said compartment having an air intake means and an air exhaust means,
an air filter means positioned between the air intake means of said cabinet means and said air intake means of said compartment,
blower means in said cabinet means for drawing air into the air intake means of said cabinet means, through said air filter means, through said air intake means of said compartment, through said air exhaust means of said compartment, and outwardly through said air exhaust means of said cabinet means,
an air sampling means positioned remotely of said cabinet means,
and a hose means operatively connected to said air intake of said air pump and extending from said cabinet means to said air sampling means.

2. The apparatus of claim 1, wherein said air exhaust means comprises an elongated flexible hose member which may be utilized as an air agitation means.

3. The apparatus of claim 1, wherein said air intake means of said compartment and said air exhaust means of said compartment are arranged so that air passing through said compartment will be passed over said air pump to cool the same.

4. The apparatus of claim 1 wherein said air exhaust means of said cabinet means is selectively closable.

* * * * *